Aug. 11, 1936.   C. F. McCULLOUGH   2,050,721
ALIGNMENT FIXTURE
Filed Dec. 7, 1934   2 Sheets-Sheet 1
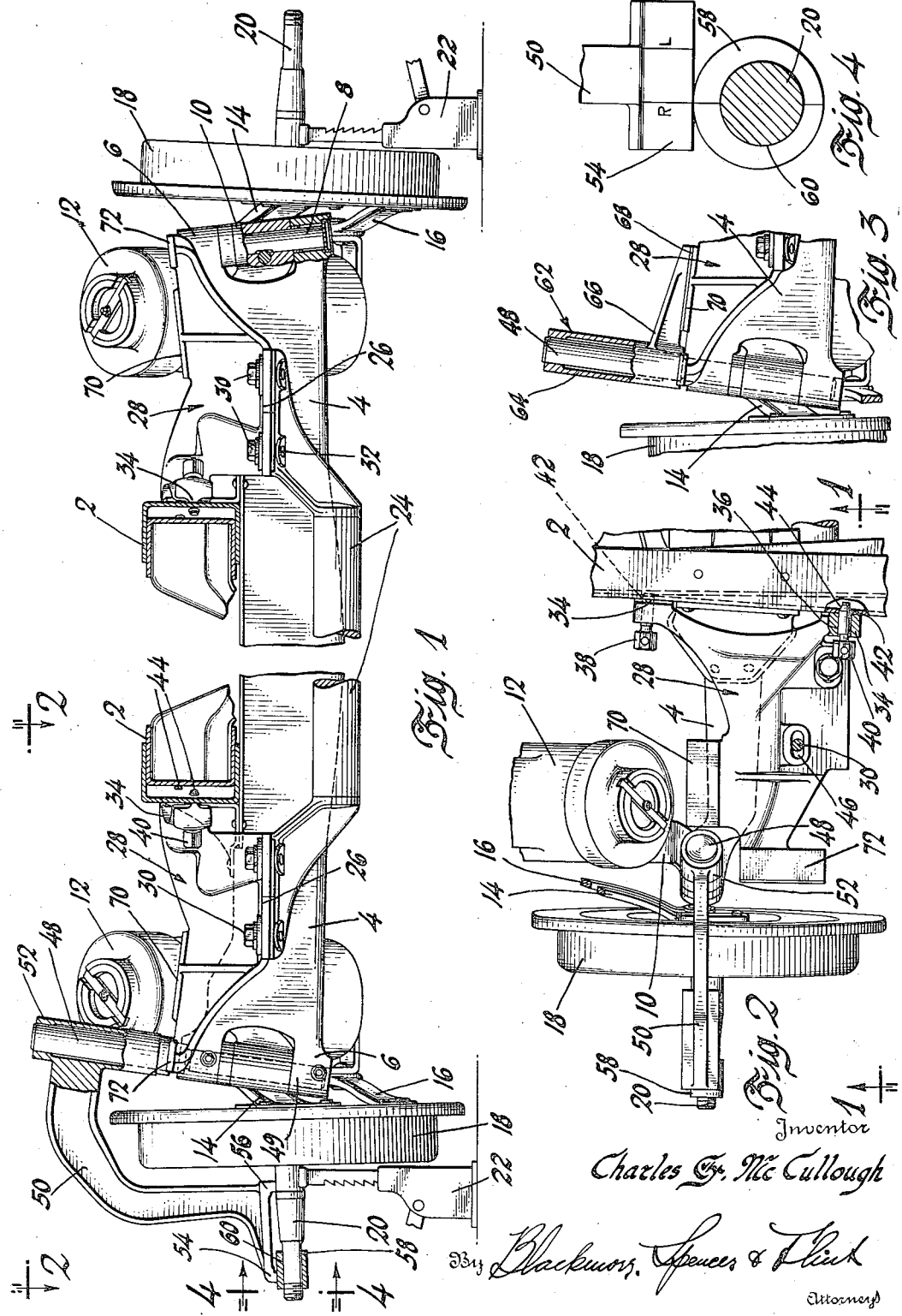
Inventor
Charles F. McCullough
By Blackmore, Spencer & Flint
Attorneys

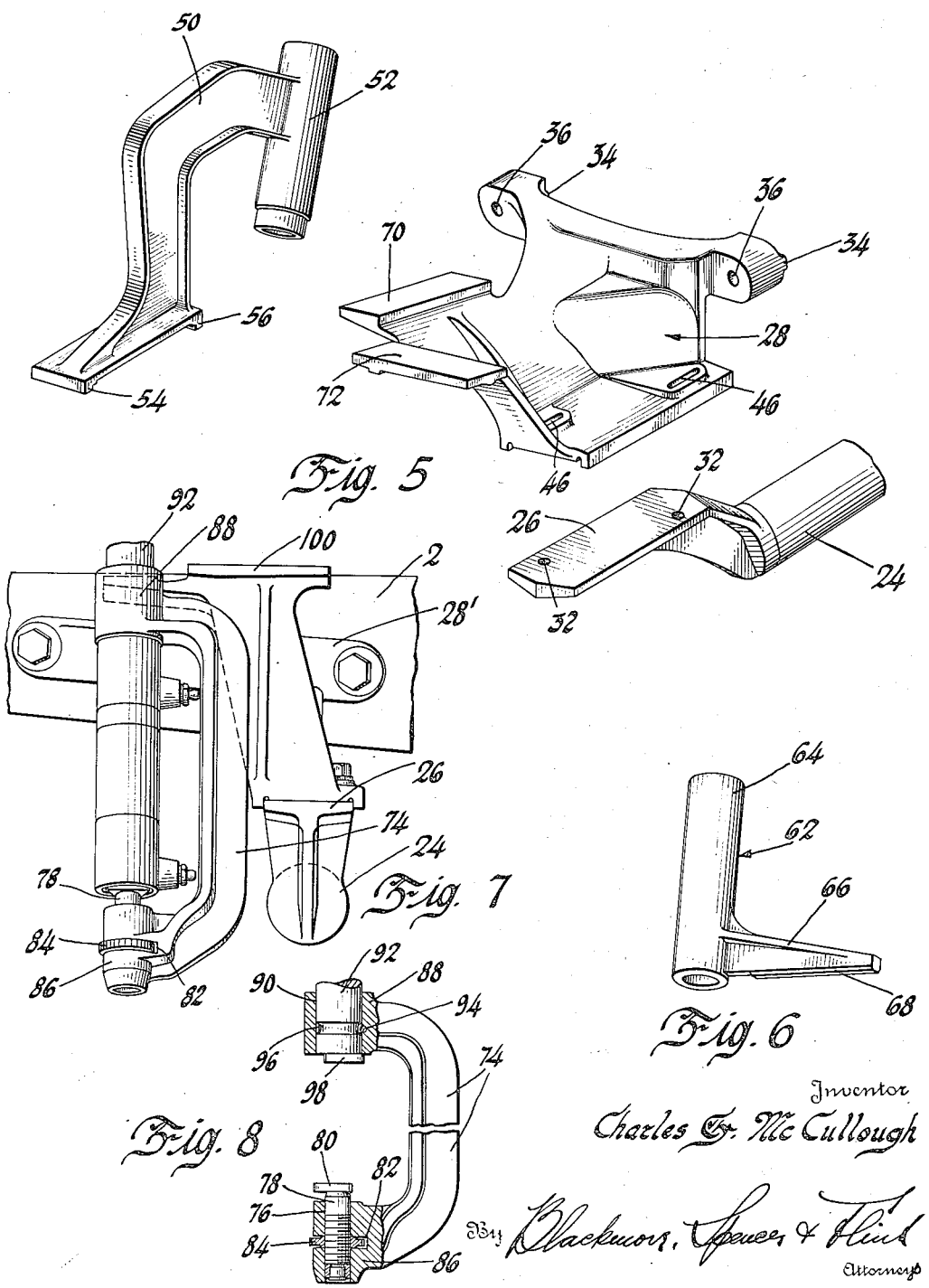

Patented Aug. 11, 1936

2,050,721

UNITED STATES PATENT OFFICE 2,050,721

ALIGNMENT FIXTURE

Charles F. McCullough, Detroit, Mich., assignor to General Motors Corporation, Detroit, Mich., a corporation of Delaware Application December 7, 1934, Serial No. 756,462

7 Claims. (Cl. 33—203)

This invention relates to an alignment fixture and more particularly to an alignment fixture which may be applied to an automative vehicle by which the king pin inclination, caster and camber of the front wheels of a car may be checked.

Many elaborate and expensive mechanisms have heretofore been devised to check the front wheel alignment of motor cars, but the majority of these were cumbersome to operate and when the newer cars were equipped with independent front wheel suspension many had to be discarded.

It is an object of my invention to provide an alignment fixture for testing the front wheel alignment of cars having individually sprung front wheels.

It is a further object of my invention to provide an alignment fixture for testing front wheel alignment which is simple and easy to apply to a car with a minimum of dismantling of original car parts.

With the above and other objects in view, my invention resides in the construction as described in the specification, set forth in the claims and illustrated in the accompanying drawings, in which:

Figure 1 is a plan view of the front suspension assembly of a car with the wheels removed, parts being broken away, looking in the direction of the arrows 1—1 of Figure 2.

Figure 2 is a top view looking in the direction of the arrows 2—2 in Figure 1.

Figure 3 is a plan detail view of the king pin assembly with one of the gauges applied.

Figure 4 is a sectional view taken on the line 4—4 of Figure 1.

Figure 5 is a perspective view of members on one end of the fixture, the parts being shown in spaced relation.

Figure 6 is a perspective view of a second gauge to be used with the fixture.

Figure 7 is an end view of a modified form of aligning fixture.

Figure 8 is a detail view of the clamping means for the gauge pin of the modified form, parts being broken away.

The longitudinal side frame members 2 of a motor car have secured across them near the forward end a front cross member 4. At each end of the member is rigidly formed therewith a king pin supporting yoke 6, both arms of which are drilled to support a king pin 8. Positioned between the arms of the yoke is pivotally supported one end of a lever 10, the king pin projecting through this end to allow the pivotal movement. This lever supports a totally inclosed spring supporting unit 12, whose particular construction forms no part of my invention and so will not be described. From the side of each of these units project two parallel pivoted levers 14 and 16 which support the brake drum 18 and wheel axle 20. The construction to this point is conventional and per se forms no part of my invention.

When it becomes necessary to check the alignment of the front wheels in a car the forward end is supported on jacks 22 with the wheels removed as shown in Figure 1. The jacks are placed under the stub axles so that the latter will be in the normal loaded position. A bar member 24 having flattened end portions 26 is placed beneath the front of the frame and one end bracket 28 is secured to the flat face of one end by bolts 30 which are threaded into suitable openings 32 in the end portions. The upper end of the brackets has two bosses 34 adapted to contact the side of the frame member 2. Through each of these bosses 34 is drilled a hole 36 for the insertion of locating pins 38 and 40. In the frame opposite the pins when the bracket is in correct position are two holes 42 which have been placed there in the manufacturing process. The forward pin is inserted in the frame hole first and then the rear pin 40 is driven in, the point of the pin being tapered as at 44 to allow for slight variation in the positions of the frame holes.

The bracket on the other side of the frame is then applied to the frame by inserting the pins in the frame holes and then bolting the bracket to the bar and member. This secures and correctly positions the bar member and both brackets on the front of the frame. The bosses 34 should always be flush against the frame when in position even though the tapered pin does not project all the way in. The holes 46 in the brackets through which the bolts 30 project are elongated to provide a small amount of endwise movement and also provide for variations in frame width.

The king pin bearing cones are removed and a pin member 48 whose lower section 49 has the same diameter as the king pin is then driven in until this section occupies the position of the king pin, which of course forces the king pin out. A portion of the pin is left projecting above the king pin support. An angle arm 50, one end of which has a hollow tubular portion 52 integral therewith which is adapted to be slid onto the pin 48, has on its outer end two spaced legs 54 and 56. The leg 56 is adapted to contact the inner portion of the axle 20 if the latter is in correct position. A bushing 58 having an eccentric opening 60 therethrough is adapted to be placed on the outer end of the axle and its outer periphery may be turned to contact the leg 54 with its gauge line in alignment with either the R or the L line on the leg 54 depending on whether it is the right or the left wheel. Therefore, in order for the wheel to have the correct camber, the leg 56 must contact the axle and the leg 54 must be spaced from the outer end a certain distance as gauged by the bushing, with the lines on the leg and the bushing in alignment.

After the wheel axle has been adjusted for camber, the bracket 50 is removed from the pin 48 and a second gauge member 62 slid on, as shown in Figure 3, which has a hollow sleeve 64 to contact the pin. There is an arm 66 projecting from the sleeve at approximately a right angle having a flat gauging surface 68 on the bottom thereof. The gauge is used for testing the king pin inclination and caster.

Behind the portion of the bracket 28 which carries the bosses 34 are located two flat surfaces 70 and 72, which are placed at right angles to each other, and longitudinally and transversely of the car body. If the king pin has the proper amount of inclination when the gauge 62 is slipped down on the pin 48 and the surface of the lower side 68 placed over the flat surface 70 transversely of the car frame, it should contact evenly therewith throughout its length, which checks the proper lateral inclination. It is then turned 90° and placed in juxtaposition over the surface 72, which checks the longitudinal inclination or caster of the king pin. If in either of these cases the surface 68 contacts at one end only with the surfaces 70 or 72, the distance that the opposite ends are apart is a measure of the amount that the king pin is out of proper inclination and caster.

If it is not desired to remove the king pin, such as is necessary with the above construction, a C-clamp may be used to hold the king pin extension in place and obviate the necessity of removing the king pin as shown in Figures 7 and 8. That form has a large C-clamp 74, whose jaws are wide enough to pass over the ends of the king pin supporting yoke. The lower jaw 86 has an opening 76 therein for a stud 78, whose inner end projects from the jaw and has a plug 80 secured thereto which is adapted to be inserted in the lower portion of the king pin yoke openings. The jaw has a slot 82 cut therein transverse to the stud in which is inserted a thumb nut 84 with a knurled outer surface through which the stud projects and by which the stud is fed laterally. The upper jaw 88 of the C-clamp has an opening 90 in alignment with the stud 78. The king pin extension 92 is supported in this opening and retained therein by a pin 94, which engages a groove 96 in the pin. The lower or inner end of the pin extension also has a projection 98 which is adapted to engage the upper end of the king pin opening in the supporting yoke. To apply this king pin extension for the application of gauges, the projection 98 is placed in the upper opening. The C-clamp is swung around so that the projection 80 is opposite to the lower opening and then nut 84 is turned to feed it into the opening and tighten it.

The only other change necessary in the remaining apparatus is that the gauge pads 100 on the bracket 28' are slightly higher than the pads 70 and 72 on the bracket 28. This change is necessary in order that the C-clamp may be applied to the king pin yoke and have its lowered portion under the pads.

This fixture is easy to apply to the car as one bracket may remain bolted to the cross rod 24 and the other bolted after application to the frame. Then it is only necessary to either knock out the king pin with an extension pin or clamp one on, and then in three short operations check for camber, caster and inclination with gauges applied to the king pin extension.

I claim:

1. An alignment fixture for motor cars having a frame and a wheel support pivoted on a king pin comprising a cross-member, clamping brackets secured to opposite ends of the cross member to secure the whole to the frame having gauging means thereon, means secured in alignment with the king pin openings and means fitting on the last named means to gauge certain angles.

2. An alignment fixture for motor cars having a frame and a wheel support pivoted on a king pin comprising a cross member, clamping brackets having gauging means thereon secured to the opposite ends of the cross member, spaced holes in the frame, locating pins in each bracket for insertion in the holes whereby the whole may be clamped to the frame in a definite position, a pin supported in alignment with the normal position of the king pin and gauges adapted to be applied to the pin for checking certain angles in conjunction with the gauging means.

3. In an alignment fixture for motor cars having a wheel axle and king pin support therefor, means in alignment with the king pin openings, means fitting on the first named means and having spaced portions, one engaging the axle and gauging means slidable on the axle and engaging the second portion to gauge the camber.

4. In an alignment fixture for motor cars, having a frame and a wheel support pivoted on a king pin, means secured to the frame, means secured in alignment with the king pin openings, and means adapted to slide on and supported by the last named means to gauge the king pin inclination in conjunction with the first named means.

5. In an alignment fixture for motors cars having a wheel supporting axle pivotally mounted on a king pin, a C-clamp support engaging the ends of the king pin openings and an extension pin carried by the clamp for positioning and holding certain gauging apparatus.

6. In an alignment fixture for motor cars having a frame, a wheel supporting axle carried on a king pin and a king pin support, means clamped to the frame for supporting gauging means, means secured to the king pin support in alignment with the normal position of the king pin, and means adapted to be supported by the last named means to cooperate with the gauging means to check certain angles.

7. In an alignment fixture for motor cars having a frame, a wheel supporting axle pivotally mounted on a king pin, and a yoke having openings therein supporting the ends of the king pin from the frame, means engaging the openings in the yoke having a pin supported thereby in alignment therewith, a member clamped on the frame, gauging pads carried by the member, and means adapted to be placed on the pin and cooperating with the gauging pads to check given angles.

CHAS. F. McCULLOUGH.